United States Patent [19]

Wetmore et al.

[11] Patent Number: 5,562,363
[45] Date of Patent: * Oct. 8, 1996

[54] APPARATUS FOR VITRIFYING HAZARDOUS WASTE

[75] Inventors: Kenneth H. Wetmore, Perrysburg; Kenneth R. Kormanyos, Sylvania; Stephen F. Cox, Perrysburg, all of Ohio

[73] Assignee: Stir-Melter, Inc., Perrysburg, Ohio

[*] Notice: The term of this patent shall not extend beyond the expiration date of Pat. No. 5,536,114.

[21] Appl. No.: 246,414

[22] Filed: May 20, 1994

[51] Int. Cl.$^6$ ............................. B09B 3/00; A62D 3/00
[52] U.S. Cl. .................. 405/128; 405/131; 588/252; 65/135.6; 432/206; 110/186
[58] Field of Search .................... 588/252, 256, 588/259, 249, 900, 260, 258; 65/27, 134.8, 135.6; 405/128, 129; 110/185, 186, 250; 432/206; 425/169; 264/40.1; 219/68

[56] References Cited

U.S. PATENT DOCUMENTS

| | | | |
|---|---|---|---|
| 3,812,620 | 5/1974 | Titus et al. | 110/250 X |
| 4,139,488 | 2/1979 | Knotik et al. | 588/252 X |
| 4,475,204 | 10/1984 | Brandt et al. | 65/135.6 X |
| 4,655,932 | 4/1987 | Roslonski | 110/250 X |
| 4,666,490 | 5/1987 | Drake | 588/256 |
| 4,672,366 | 6/1987 | Butts | 588/259 X |
| 4,676,819 | 6/1987 | Radecki et al. | 65/27 X |
| 4,678,493 | 7/1987 | Roberts et al. | 65/27 X |
| 4,688,495 | 8/1987 | Galloway | 588/252 X |
| 4,770,109 | 9/1988 | Schlienger | 110/250 X |
| 4,820,328 | 4/1989 | Roberts et al. | |
| 4,846,675 | 7/1989 | Soliman | 432/206 X |
| 4,886,539 | 12/1989 | Gerutti et al. | 65/27 X |
| 5,100,453 | 3/1992 | Richards. | |
| 5,164,174 | 11/1992 | Banker et al. | 588/252 X |
| 5,245,935 | 9/1993 | Fukuda | 110/250 |
| 5,291,839 | 3/1994 | Wong | 110/250 X |
| 5,304,701 | 4/1994 | Igarashi | 65/134.8 X |
| 5,424,042 | 6/1995 | Mason et al. | 588/252 X |
| 5,451,738 | 9/1995 | Alvi et al. | 110/250 X |

*Primary Examiner*—Dennis L. Taylor
*Attorney, Agent, or Firm*—Brooks & Kushman P.C.

[57] ABSTRACT

Apparatus (10) and a method for vitrifying hazardous waste includes a melting vessel (12) in which a stirrer (38) mixes hazardous waste and any other necessary components for forming a glassy mixture upon heating while an electrical current is applied across the melting vessel and the stirrer to provide electrical current flow, and a metallic containment vessel (46) of the apparatus receives the melting vessel so as to receive and contain any material that exits the melting vessel upon failure. Any failure of the melting vessel (12) is detected by a sensor (48). The containment vessel (46) is hermetically sealed around the melting vessel (12) to contain gases as well as any melted material received from the failed melting vessel (12). The sensing of the failure can be either by a pressure change in the hermetically sealed chamber (58) or by sensing of the presence of material received by the containment vessel (46) from the failed melting vessel (12) such as by an electrical circuit type detection.

9 Claims, 1 Drawing Sheet

APPARATUS FOR VITRIFYING HAZARDOUS WASTE

TECHNICAL FIELD

This invention relates to apparatus and a method for vitrifying hazardous waste.

BACKGROUND ART

Vitrification of waste materials has previously been accomplished in ceramic lined melting vessels that are capable of being heated to relatively high temperatures such as on the order of about 1500° C. to 1600° C. Such heating as disclosed by U.S. Pat. No. 4,820,328 Roberts et al can be utilized to vitrify waste asbestos by a high temperature melting process. Furthermore, as disclosed by U.S. Pat. No. 5,100,453 Richards such high temperature melting can be utilized to recycle glass fibers such as of the type utilized for building insulation. Likewise, incinerator fly ash can also be vitrified by such high temperature melting in a ceramic melting vessel. During such processing, the waste and any other necessary components to form a glassy material upon heating are introduced into the ceramic melting vessel, and the melted material permeates into seams or any cracks in the ceramic melting vessel sufficiently to cool and thereby seal the vessel so that there is no leakage.

Vitrification of hazardous waste at a lower temperature such as on the order of about 1000°to 1100° C. has also previously been done by heating in a metallic melting vessel in which a stirrer or mixer is also provided with an electrical current being passed through the melted material between the metallic melting vessel and the stirrer which act as electrodes across which an electrical potential is applied. It is believed that this type of heating provides superior results due to the direct generation of heat within the melted material by the passage of electric current uniformly through the melt between the stirrer and the melting vessel. When hazardous waste such as nuclear waste or heavy metals etc. is vitrified by this type of heating, the resultant melted mixture can be delivered into a container for storage upon cooling. However, the metallic melting vessel can fail during use and, in such case, hazardous waste in the melting vessel can contaminate the facility in which the processing is being performed. Such contamination can be a particular problem when nuclear waste processing is involved.

DISCLOSURE OF INVENTION

Objects of the present invention are to provide improved apparatus and a method for vitrifying hazardous waste in a manner that provides containment of the waste in case of failure of the melting vessel in which the hazardous waste is heated for the vitrification.

In carrying out the above objects, apparatus for vitrifying hazardous waste in accordance with the present invention includes a metallic melting vessel for receiving hazardous waste and any other necessary components for forming a glassy material upon heating. A stirrer of the apparatus provides mixing of molten material in the melting vessel and an electrical voltage is applied across the melting vessel and the stirrer to provide electrical current flow through the molten material for heating thereof during the mixing. The apparatus also includes a metallic containment vessel in which the melting vessel is located so the containment vessel upon failure of the melting vessel receives and contains any material that exits the failed melting vessel. A sensor of the apparatus is also provided for detecting the failure of the melting vessel.

The containment vessel is hermetically sealed around the melting vessel to form an enclosed chamber that contains gases as well as any other material that exits the failed melting vessel.

Different embodiments of the sensor are disclosed. In one embodiment, the sensor is communicated with the hermetically sealed chamber between the melting vessel and the containment vessel to detect a change in pressure within the hermetically sealed chamber when the melting vessel fails to thereby detect such failure. In other embodiments, the sensor for detecting failure of the melting vessel senses the presence of material received by the containment vessel from the failed melting vessel and preferably includes an electrical circuit that detects the presence of material received by the containment vessel from the failed melting vessel. In one embodiment, the electrical circuit of the sensor includes a pair of electrical probes that are located between the melting and containment vessels and are normally electrically isolated from each other until material received by the containment vessel from the failed melting vessel electrically connects the probes to each other. In another embodiment, the electrical circuit includes a flow path that is located between the melting and containment vessels and that is normally closed but is opened by the presence of material received by the containment vessel from the failed melting vessel.

In the preferred construction, the apparatus also includes another sensor for sensing failure of the melting vessel so as to provide a fail-safe detection of the melting vessel failure. Thus, there is a pair of sensors for detecting the failure of the melting vessel, and each sensor is preferably either a sensor that is communicated with the hermetically sealed chamber between the melting vessel and the containment vessel to sense a change in pressure when the melting vessel fails, or a sensor including an electrical circuit that senses the presence of material received within the containment vessel from the failed melting vessel.

In carrying out the objects of the invention, the method for vitrifying hazardous waste is performed by introducing hazardous waste and any other necessary components for forming a glassy material upon heating into a metallic melting vessel. Mixing of molten material within the melting vessel is performed by a stirrer while passing an electrical current between the melting vessel and the stirrer. The melting vessel is also located within a metallic containment vessel so as to contain any material that exits the melting vessel upon failure of the melting vessel. Sensing for a failure of the melting vessel is also performed to provide an indication that the processing should be terminated so that the hazardous waste does not contaminate the facility in which the processing is being performed.

In one preferred practice of the method, the sensing for failure of the melting vessel is performed by detecting a change in pressure of the hermetically sealed chamber between the melting and the containment vessels.

In another preferred practice of the method, the sensing for failure of the melting vessel is performed by detecting the presence of material received within the containment vessel from the failed melting vessel. The presence of material received within the containment vessel from the failed melting vessel is disclosed as being detected by an electrical circuit.

The most preferred practice of the method utilizes a pair of sensors to detect failure of the melting vessel so that this detection is performed in a fail-safe manner.

BEST MODES FOR CARRYING OUT THE INVENTION

Figure 1:
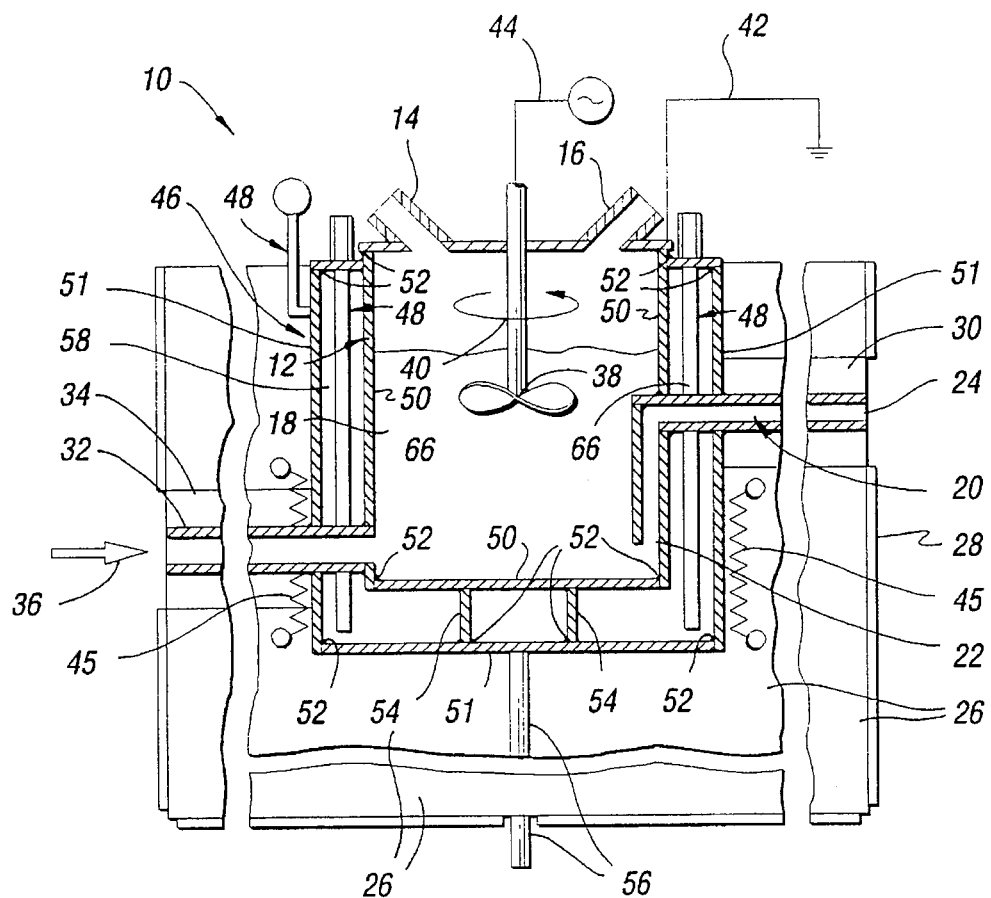
FIG. 1 is an elevational view taken in section through apparatus constructed in accordance with the present invention to provide the method thereof for vitrifying hazardous waste.

With reference to FIG. 1, apparatus 10 constructed in accordance with the present invention performs the method thereof for vitrifying hazardous waste such as nuclear waste, heavy metals etc. This apparatus includes a metallic melting vessel 12 having an inlet 14 for receiving hazardous waste and any other necessary components for forming a glassy material upon heating as is hereinafter more fully described. The melting vessel 12 also has a gas outlet 16 through which gases generated by the processing can flow outwardly for any necessary treatment prior to being released to the atmosphere. Molten material 18 within the vessel 12 is delivered through an outlet 20 with a lower entry end 22 and an upper outer exit end 24 with a construction that functions like a teapot spout. Outlet 20 which has a tubular construction outwardly of the melting vessel 12 extends through a suitable heating insulation 26 secured by an outer shell 28, and the outlet 20 is also surrounded by a heater 30 to maintain the material molten until it is delivered to a suitable container for cooling and consequent solidification. Likewise, a lower drain 32 of a metallic tubular construction extends through the insulation 26 and is surrounded by an associated heater 34 with its outer end closed by a water cooled plug 36 that can be removed to permit drainage of the melting vessel 12 when necessary.

A stirrer 38 of the apparatus is electrically conductive such as by being made of metal and is rotated as shown by arrow 40 to mix the molten material as an electrical voltage is applied across the melting vessel 12 and the stirrer as shown by the electrical potentials 42 and 44. This electrical potential provides an electrical current flow through the molten material 18 for heating thereof during the mixing by the stirrer 38. An alternating current functions best in that it prevents plating of components on the stirrer 38 or the melting vessel 12. In order to commence the current flow, it is necessary to lower the impeller 38 to close proximity with the melting vessel floor and to introduce a preliminary amount of solid materials through the inlet 14 to cover the impeller. Auxiliary electrical resistance heaters 45 within the insulation 26 provide sufficient heat to the solid material to bring it to a molten state capable of conducting electric current between the impeller and the melting vessel. Following the start of electric melting via current flow between the impeller and vessel, additional solid material is fed to the vessel as the impeller is raised to its operating height as shown in FIG. 1.

A metallic containment vessel 46 of the apparatus 10 shown in FIG. 1 is located around the melting vessel 12 so the containment vessel upon failure of the melting vessel receives and contains any material that exits the failed melting vessel. Thus, any hazardous waste component of material that exits the failed melting vessel 12 will not contaminate the facility in which the apparatus 10 is located but, rather will be contained within the containment vessel 46 which can then be properly processed during a cleanup operation. Furthermore, apparatus 10 also includes at least one sensor 48 for detecting failure of the melting vessel as is hereinafter more fully described.

With continuing reference to FIG. 1, it will be noted that both the metallic melting vessel 12 and metallic containment vessel 46 are respectively made from metal plates 50 and 51 that are secured by welds 52 with these two vessels essentially being unitized with each other after completion of the assembly. Lower supports 54 provide the necessary support between the floor plates 50 and 51 while a support rod 56 extends downwardly from the containment vessel floor plate 50 through the insulation 26 to provide support for the unitized melting and containment vessels 12 and 46. Suitable unshown supports between the sidewall plates 50 and 51 of the melting and containment vessel 12 and 46 are also provided and like all of the plates and supports are secured by associated welds.

The metal plates 50 and 51 are made from high temperature resistant metal alloys such as alloys of nickel and chromium. Specific alloys that can be used are sold by Inco Alloys International, Inc. of Huntington, W. Va. United States of America under the trademark INCONEL. One such alloy is designated INCONEL 601 and has a composition in parts by weight of: Aluminum- 1 part, chromium- 23 parts, iron - 14 parts, and nickel- 61 parts. Another such alloy is designated INCONEL 690 and has a composition in parts by weight of: chromium- 29 parts, iron- 9 parts, and nickel- 62 parts.

With continuing reference to FIG. 1, the containment vessel 46 is hermetically sealed around the melting vessel 12 to form an enclosed chamber 58. Such an enclosed chamber is preferable to having an open space between the two vessels since any gas that exits the failed melting vessel 12 will then also be contained within the containment vessel 46 which would not be the case if the vessels are not hermetically sealed.

Figure 2:
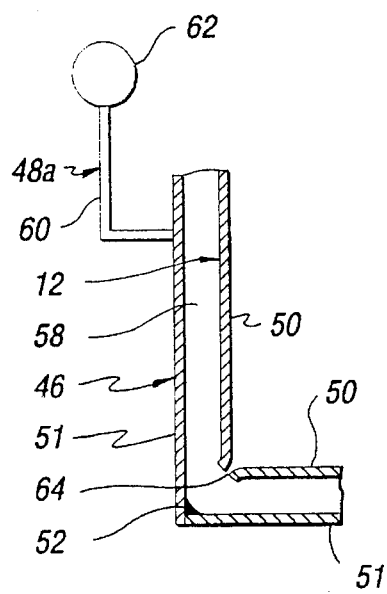
FIG. 2 is a view that illustrates a pressure sensor for detecting failure of a melting vessel of the apparatus.

With additional reference to FIG. 2, one embodiment of the sensor 48a is illustrated as having a conduit 60 communicated with the hermetically sealed chamber 58 between the melting vessel 12 and the containment vessel 46 to detect a change in pressure within the hermetically sealed chamber when the melting vessel fails to thereby detect such failure. More specifically, the sensor 48a has a pressure gauge 62 which can detect the pressure change when there is a failure such as illustrated at 64 between the floor and side wall plates 50 of the melting vessel 12. Such pressure change may be an increase in pressure if a vacuum is initially drawn in the chamber 58 or may also be a decrease in pressure if the chamber is initially pressurized.

Figure 3:
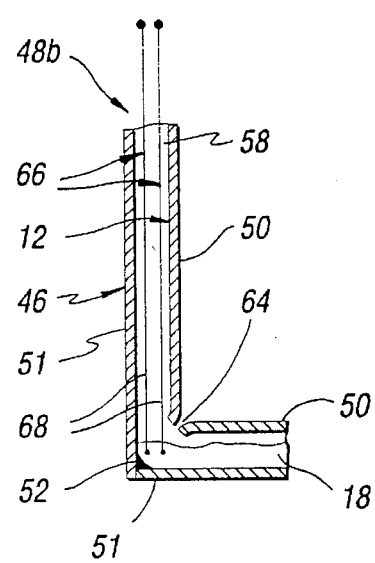
FIG. 3 is a view that illustrates a normally open electrical circuit sensor for sensing the failure of the melting vessel.
Figure 4:
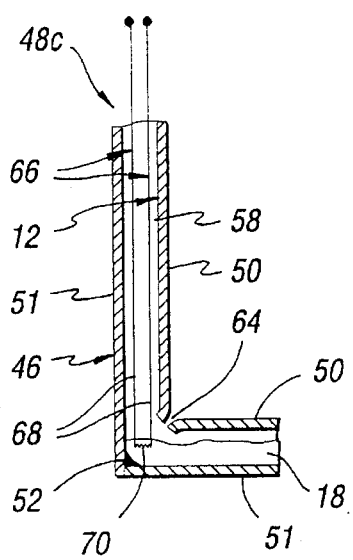
FIG. 4 is a view that illustrates a normally closed electrical circuit sensor for sensing the failure of the melting vessel.

With reference to FIGS. 3 and 4, two further embodiments 48b and 48c of the sensor are constructed to detect failure of the melting vessel 12 by sensing the presence of material 18 received by the containment vessel 46 from the failed melting vessel 12. Each of the sensors 48b and 48c includes an electric circuit 66 that detects the presence of material received by the containment vessel 46 from the failed melting vessel 12.

In the embodiment of the sensor 48b shown in FIG. 3, the electrical circuit 66 includes a pair of electrical probes 68 that are located between the melting and containment vessels 12 and 46 and are normally electrically isolated from each other with their lower ends suspended just above the containment vessel floor plate 51 in a spaced relationship thereto and with respect to each other. Material 18 received from the melting vessel 12 upon failure thereof such as through the failure 64 indicated electrically connects the lower ends of the probe 68 to complete the electrical circuit 66 and thereby provide an indication of the failure.

With reference to FIG. 4, the embodiment of the sensor 48c has the electrical circuit 66 thereof located between the melting and containment vessels 12 and 46 and having a meltable fuse 70 extending between the lower ends of the probes 68. When the material 18 is received from the failed melting vessel 12 such as through the failure 64 shown, the fuse 70 is melted to open the circuit 66 as the probes 68 then become electrically isolated from each other as compared to being electrically connected when the fuse is in place for the relative level of electric potential between the electrical probes.

In the preferred construction of the apparatus 10 shown in FIG. 1, there are at least two of the sensors for sensing the failure of the melting vessel 12. These sensors are most preferably of the type illustrated in FIGS. 2, 3 and 4. More specifically, as illustrated, there are two of the sensors 48 having the electrical circuit 66 and are located at opposite sides of the unitized melting and containment vessels 12 and 46. Suitable openings may be provided in the floor supports 54 so that the material received can flow back and forth so that failure at any part of the melting vessel 12 will activate these material presence sensing type sensors. Furthermore, the apparatus 10 is illustrated as having the pressure sensor 48 at its upper left side as well as the other two sensors. Suitable openings can also be provided in the unshown supports between the side wall plates 50 and 51 as well as in the floor supports 54 so that the entire extent of the hermetically sealed chamber 58 is communicated with the pressure sensor 48a for its operation when this type of sensor is used.

The hazardous waste vitrifying method of the invention is performed by introducing the hazardous waste and any other necessary components for forming a glassy material upon heating through the inlet 14 into the metallic melting vessel 12. Mixing of the molten material 18 within the melting vessel 12 is performed by the stirrer 38 while an electrical current is passed between the melting vessel and the stirrer. Locating the melting vessel 12 within the metallic containment vessel 46 contains any material that exits the melting vessel upon failure of the melting vessel and the sensing of this failure by at least one of the sensors 48 provides the indication that the processing should be terminated.

As discussed above, the sensing for the failure of the melting vessel 12 can be performed by detecting a change in the pressure of the hermetically sealed chamber 58 between the melting and containment vessels 12 and 46 and can also be performed by detecting the presence of material received within the containment vessel from the failed melting vessel, with this latter type of detection preferably being performed by an electrical circuit. Furthermore, as previously mentioned, the method is most preferably performed by utilizing a pair of the sensors to detect failure of the melting vessel 12 in a fail-safe manner.

While the best modes for practicing the invention have been described in detail, those familiar with the art to which this invention relates will recognize various alternative designs and embodiments for practicing the invention as defined by the following claims.

What is claimed is:

1. Apparatus for vitrifying hazardous waste, comprising:
   a metallic melting vessel for receiving hazardous waste and any other necessary components for forming a glassy material upon heating;
   a stirrer for mixing molten material in the melting vessel as an electrical voltage is applied across the melting vessel and the stirrer to provide electrical current flow through the molten material for heating thereof during the mixing;
   a metallic containment vessel in which the melting vessel is located so the containment vessel upon failure of the melting vessel receives and contains any material that exits the failed melting vessel, and the containment vessel being hermetically sealed around the melting vessel to form an enclosed chamber; and
   a sensor that is located externally of the melting vessel and at least partially externally of the containment vessel and that detects failure of the melting vessel.

2. Apparatus for vitrifying hazardous waste as in claim 1 wherein the sensor is communicated with the hermetically sealed chamber between the melting vessel and the containment vessel to detect a change in pressure within the hermetically sealed chamber when the melting vessel fails to thereby detect such failure.

3. Apparatus for vitrifying hazardous waste as in claim 1 wherein the sensor for detecting failure of the melting vessel senses the presence of material received by the containment vessel from the failed melting vessel.

4. Apparatus for vitrifying hazardous waste as in claim 3 wherein the sensor includes an electrical circuit that detects the presence of material received by the containment vessel from the failed melting vessel.

5. Apparatus for vitrifying hazardous waste as in claim 4 wherein the electrical circuit of the sensor includes a pair of electrical probes that are located between the melting and containment vessels and are normally electrically isolated from each other until material received by the containment vessel from the failed melting vessel electrically connects the probes to each other.

6. Apparatus for vitrifying hazardous waste as in claim 4 wherein the electrical circuit of the sensor includes a flow path that is located between the melting and containment vessels and that is normally closed but is opened by the presence of material received by the containment vessel from the failed melting vessel.

7. Apparatus as in claim 1 further including another sensor for sensing failure of the melting vessel.

8. Apparatus for vitrifying hazardous waste material as in claim 1 further including another sensor communicated with the hermetically sealed chamber between the melting vessel and the containment vessel to sense a change in pressure when the melting vessel fails.

9. Apparatus for vitrifying hazardous waste as in claim 1 further including another sensor having an electrical circuit that senses the presence of material received within the containment vessel from the melting vessel to thereby sense failure of the melting vessel.

\* \* \* \* \*